(12) United States Patent
Lee et al.

(10) Patent No.: US 10,315,201 B2
(45) Date of Patent: Jun. 11, 2019

(54) AIR CLEANER FOR AIR CONDITIONER

(71) Applicant: LG ELECTRONICS INC., Seoul (KR)

(72) Inventors: Yanghwa Lee, Changwon-si (KR); Hojung Kim, Changwon-si (KR); Woojin Kim, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 15/101,489

(22) PCT Filed: Dec. 5, 2014

(86) PCT No.: PCT/KR2014/011966
§ 371 (c)(1),
(2) Date: Jun. 3, 2016

(87) PCT Pub. No.: WO2015/084112
PCT Pub. Date: Jun. 11, 2015

(65) Prior Publication Data
US 2018/0169665 A1  Jun. 21, 2018

(30) Foreign Application Priority Data
Dec. 5, 2013 (KR) .................. 10-2013-0150900

(51) Int. Cl.
B03C 3/41 (2006.01)
B03C 3/32 (2006.01)
(Continued)

(52) U.S. Cl.
CPC .............. B03C 3/41 (2013.01); B03C 3/011 (2013.01); B03C 3/08 (2013.01); B03C 3/12 (2013.01);
(Continued)

(58) Field of Classification Search
CPC combination set(s) only.
See application file for complete search history.

(56) References Cited

U.S. PATENT DOCUMENTS 8,465,575 B2 * 6/2013 Tanaka ................ B03C 3/47
96/27
9,216,233 B2 * 12/2015 Ota ......................... A61L 9/22
(Continued)

FOREIGN PATENT DOCUMENTS

CN 1886199 12/2006
CN 1986070 6/2007
(Continued)

OTHER PUBLICATIONS

International Search Report dated Mar. 16, 2015 issued in Application No. PCT/KR2014/011966.
(Continued)

Primary Examiner — Christopher P Jones
Assistant Examiner — Sonji Turner
(74) Attorney, Agent, or Firm — Ked & Associates LLP

(57) ABSTRACT

Disclosed is an air cleaning device for air conditioners. The air cleaning device includes a charging unit, and a dust collector including ground bodies and high voltage applied bodies forming a potential difference with the ground bodies, and disposed after the charging unit in an air flow direction, the charging unit includes a charging unit body and carbon fiber electrodes installed on the charging unit body, and a hydrophilic layer is formed on the outer surface of at least one of the ground bodies and the high voltage applied bodies. The air cleaning device may minimize an amount of generated ozone and an amount of generated ions, as compared to a case having a charging unit in which electrical discharge wires and opposite electrodes are alter-
(Continued)

nately disposed, and increase dust collection efficiency with a simple structure and at low costs.

19 Claims, 3 Drawing Sheets

(51) Int. Cl.
  *B03C 3/155* (2006.01)
  *B03C 3/12* (2006.01)
  *F24F 3/16* (2006.01)
  *B03C 3/011* (2006.01)
  *B03C 3/08* (2006.01)
  *B03C 3/47* (2006.01)
  *B03C 3/60* (2006.01)

(52) U.S. Cl.
  CPC ............... *B03C 3/155* (2013.01); *B03C 3/32* (2013.01); *B03C 3/47* (2013.01); *B03C 3/60* (2013.01); *F24F 3/166* (2013.01); *B03C 2201/10* (2013.01); *F24F 2003/165* (2013.01); *F24F 2003/1682* (2013.01)

(56) References Cited

U.S. PATENT DOCUMENTS

| | | | | |
|---|---|---|---|---|
| 9,746,192 | B2* | 8/2017 | Lee | ............ F24F 1/0007 |
| 2004/0129140 | A1 | 7/2004 | Park et al. | |
| 2008/0091192 | A1* | 4/2008 | Paul | ............ A61B 18/1402 |
| | | | | 606/41 |
| 2010/0307332 | A1* | 12/2010 | Yuen | ............ A61L 9/20 |
| | | | | 95/26 |
| 2010/0313761 | A1 | 12/2010 | Tanaka et al. | |
| 2014/0009860 | A1* | 1/2014 | Lee | ............ H01T 23/00 |
| | | | | 361/230 |
| 2015/0143839 | A1* | 5/2015 | Lee | ............ F24F 1/0007 |
| | | | | 62/426 |

FOREIGN PATENT DOCUMENTS

| | | | |
|---|---|---|---|
| CN | 101746463 | | 6/2010 |
| CN | 203076088 | | 7/2013 |
| JP | 03-098658 A | | 4/1991 |
| JP | 2005 168534 | * | 6/2005 |
| JP | 2005-168534 A | | 6/2005 |
| KR | 100859840 | * | 9/2003 |
| KR | 10-0859840 B1 | | 9/2008 |
| KR | 10-2011-0045851 A | | 5/2011 |
| KR | 2012017700 | * | 2/2012 |

OTHER PUBLICATIONS

Chinese Office Action dated Mar. 26, 2018. (English Translation).

* cited by examiner

[Fig. 1]
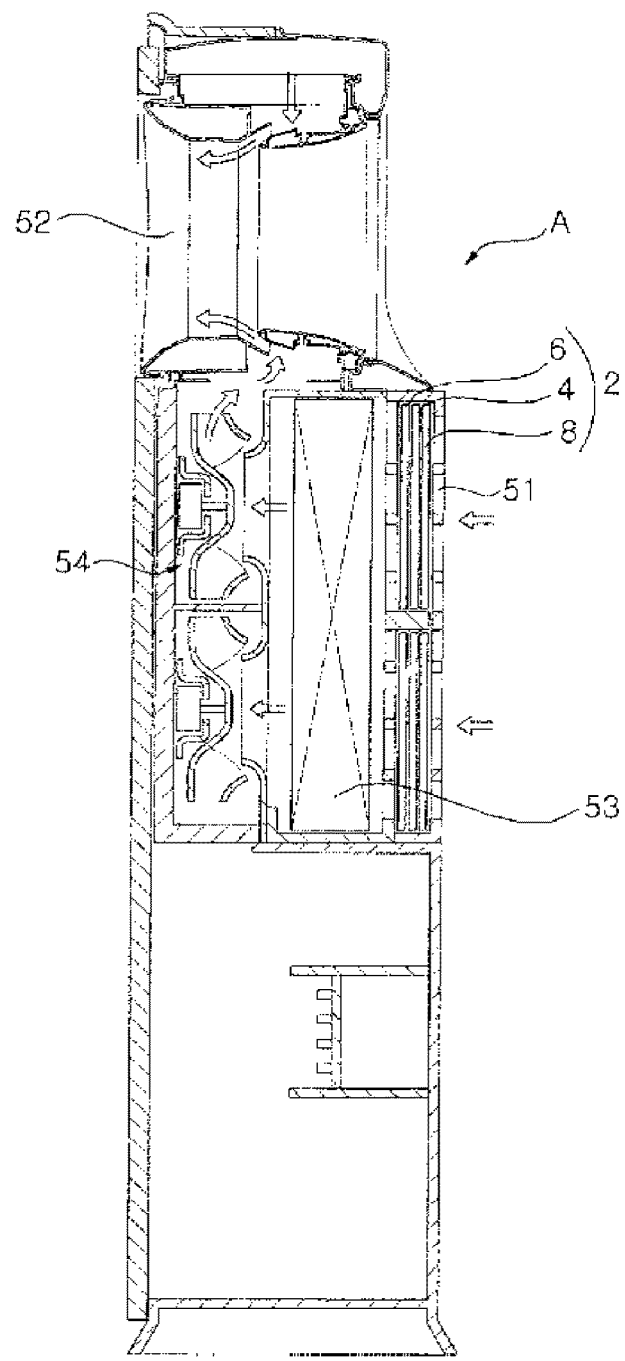

[Fig. 2]
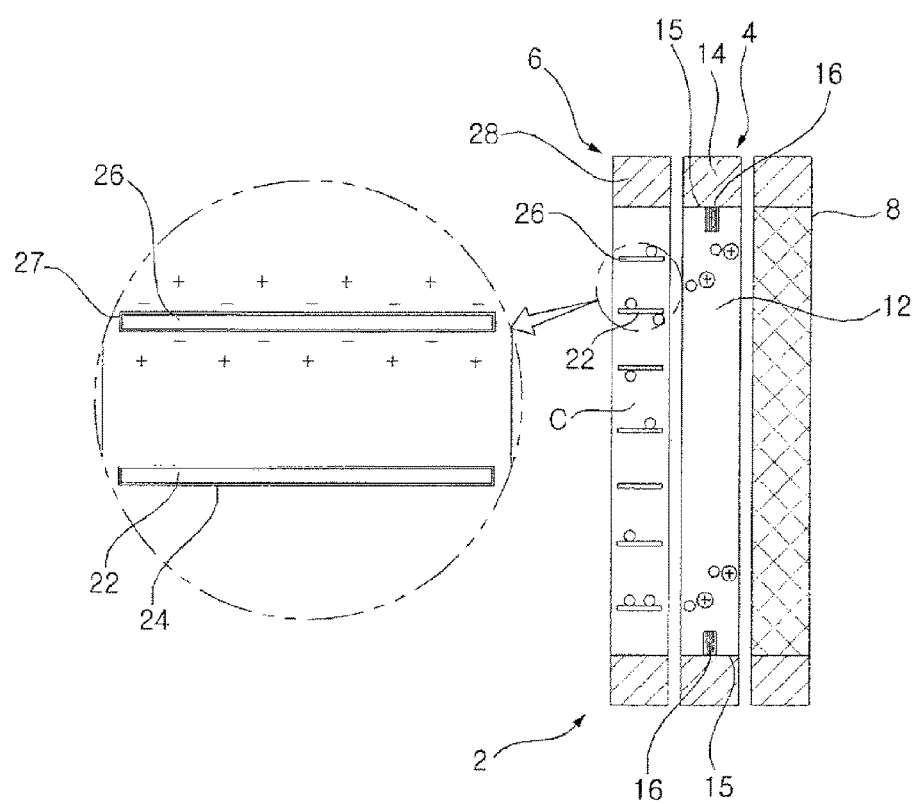

[Fig. 3]
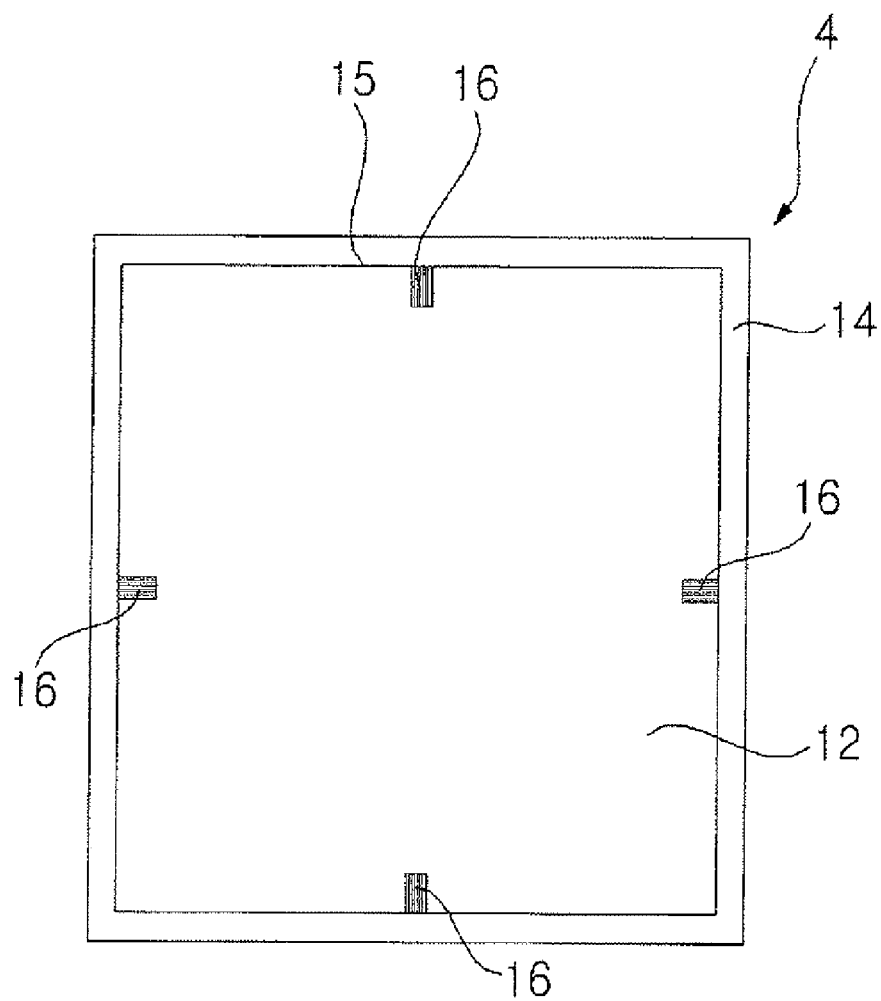

AIR CLEANER FOR AIR CONDITIONER

CROSS-REFERENCE TO RELATED PATENT APPLICATIONS

This application is a U.S. National Stage Application under 35 U.S.C. § 371 of PCT Application No. PCT/KR2014/011966, filed Dec. 5, 2014, which claims priority to Korean Patent Application No. 10-2013-0150900, filed Dec. 5, 2013, whose entire disclosures are hereby incorporated by reference.

TECHNICAL FIELD

The present invention relates to an air cleaning device for air conditioners, and more particularly to an air cleaning device for air conditioners using carbon fiber electrodes.

BACKGROUND ART

In general, air conditioners are apparatuses which suck air in, condition the air and then discharge the conditioned air to the outside, and are classified into a cooler, a heater, an air conditioner having both cooling and heating functions, a dehumidifier, and an air cleaner according to main functions thereof.

An air conditioner may cool or heat an indoor space using a refrigerating cycle including a compressor, an outdoor heat exchanger, an expansion valve and an indoor heat exchanger if an indoor temperature is changed, and include a cooler cooling the indoor space and a heater heating the indoor space. Further, an air conditioner to both cool and heat an indoor space may be provided.

The air conditioner may include an air cleaning device changing a degree of cleanness of air to clean indoor air. In this case, the air cleaning device may be installed in the air conditioner and collect foreign substances, such as dust floating in air, to remove the foreign substances.

Air cleaning devices are devices which remove fine particles, such as dust or tobacco smoke in air, and include an electric precipitator and a filter filtering out dust or tobacco smoke in air.

PRIOR ART DOCUMENT

Patent Document

KR 10-2011-0045851 (disclosed on May 4, 2011)

DISCLOSURE OF INVENTION

Technical Problem

A conventional air cleaning device for air conditioners including a charging unit in which electrical discharge wires and opposite electrodes are alternately disposed has a complicated structure and is thus high-priced, and has low dust collection efficiency and a high ozone generation rate.

Solution to Problem

In accordance with an aspect of the present invention, the above and other objects can be accomplished by the provision of an air cleaning device for air conditioners including a charging unit, and a dust collector including ground bodies and high voltage applied bodies forming a potential difference with the ground bodies, and disposed after the charging unit in an air flow direction, wherein the charging unit includes a charging unit body and carbon fiber electrodes installed on the charging unit body and a hydrophilic layer is formed on the outer surface of at least one of the ground bodies and the high voltage applied bodies.

Each carbon fiber electrode may include a brush having a bundle of a plurality of carbon fibers.

The carbon fiber electrodes may be extended in a direction perpendicular to the air flow direction.

The carbon fiber electrodes may be disposed at the edge of an air flow path.

A plurality of carbon fiber electrodes may be separated from each other.

A dust collection space may be formed in the dust collector, the dust collector may further include a dust collector body on which the ground bodies and the high voltage applied bodies are installed, and the dust collection space may be located at the rear of the plurality of carbon fiber electrodes in the air flow direction.

A space may be formed in the charging unit body, and the carbon fiber electrodes may be located at the edge of the space.

The carbon fiber electrodes may be disposed on the inner circumferential surfaces of the charging unit body so as to protrude toward the space.

The air cleaning device may further include a filter located prior to the charging unit in the air flow direction.

Advantageous Effects of Invention

The air cleaning device for air conditioners in accordance with the present invention may minimize an amount of generated ozone and an amount of generated ions, as compared to a case having a charging unit in which electrical discharge wires and opposite electrodes are alternately disposed, and increase dust collection efficiency with a simple structure and at low costs.

BRIEF DESCRIPTION OF DRAWINGS

The above and other objects, features and other advantages of the present invention will be more clearly understood from the following detailed description taken in conjunction with the accompanying drawings, in which:

FIG. 1 is a view illustrating an air cleaning device for air conditioners in accordance with one embodiment of the present invention, which is installed in an air conditioner;

FIG. 2 is a cross-sectional view of the air cleaning device for air conditioners in accordance with the embodiment of the present invention; and FIG. 3 is a view illustrating a charging unit of the air cleaning device for air conditioners in accordance with the embodiment of the present invention.

BEST MODE FOR CARRYING OUT THE INVENTION

FIG. 1 is a view illustrating an air cleaning device for air conditioners in accordance with one embodiment of the present invention, which is installed in an air conditioner, FIG. 2 is a cross-sectional view of the air cleaning device for air conditioners in accordance with the embodiment of the present invention, and FIG. 3 is a view illustrating a charging unit of the air cleaning device for air conditioners in accordance with the embodiment of the present invention.

An air cleaning device for air conditioners in accordance with this embodiment may be installed in an air conditioner A, such as a cooler, a heater, an air conditioner having both cooling and heating functions, a dehumidifier, or an air cleaner.

The air cleaning device for air conditioners (hereinafter, referred to as an "air cleaning device 2") may include a charging unit 4 and a dust collector 6. The air cleaning device 2 may be installed in the air conditioner. The charging unit 4 and the dust collector 6 may be installed in the air conditioner such that air may pass through the charging unit 4 and then pass through the dust collector 6.

The air cleaning device 2 may further include a filter 8 filtering out foreign substances from air. The filter 8 may be installed prior to the charging unit 4 in an air flow direction. In this case, air may sequentially pass through the filter 8, the charging unit 4, and the dust collector 6, thus being cleaned. The filter 8 may be installed between the charging unit 4 and the dust collector 6 in the air flow direction. In this case, air may sequentially pass through the charging unit 4, the filter 8, and the dust collector 6, thus being cleaned.

The filter 8 may be a pre-filter filtering out dust of comparatively large particles and protect the dust collector 6. If the filter 8 is located prior to the charging unit 4 in the air flow direction, damage to carbon fiber electrodes 16 of the charging unit 4, which will be described later, by foreign substances having a large volume may be prevented. If the filter 8 is located between the charging unit 4 and the dust collector 6 in the air flow direction, introduction of dust of large particles into the dust collector 6 and clogging of the dust collector 6 with dust of large particles may be prevented.

The air cleaning device 2 may be one assembly, into which the filter 8, the charging unit 4, and the dust collector 6 are assembled, and be installed in the air conditioner. The charging unit 4 and the dust collector 6 may be installed after the filter 8 in the air flow direction, and be formed separately from the filter 8 and then installed in the air conditioner A.

For example, in the case of an air conditioner including a heat exchanger 53, the air conditioner may be provided with air suction holes 51, through which air at the outside of the air conditioner is sucked into the air conditioner, and an air discharge hole 52, through which conditioned air is discharged to the outside of the air conditioner. The air conditioner may include the heat exchanger 53 performing heat exchange of air, changed by the air cleaning device 2, with a refrigerant. The air conditioner may further include an air blower unit 54 to suck indoor air into the air conditioner through the air suction holes 51, to cause the air to pass through the air cleaning device 2 and the heat exchanger 53, and then to discharge the air to the outside through the air discharge hole 52. The air cleaning device 2, the heat exchanger 53, and the air blower unit 54 may be sequentially located between the air suction holes 51 and the air discharge hole 52 in the air flow direction.

The air conditioner may be an air cleaner which excludes the heat exchanger 53 is omitted, is provided with the air suction holes 51 and the air discharge hole 52, and includes the air blower unit 54 and the air cleaning device 2. In this case, when the air cleaner is turned on, indoor air may be sucked into the air cleaner through the air suction holes 51, changed by the air cleaning device 2, and then discharged to the outside through the air discharge hole 52.

The air cleaning device 2 may be a dust collection filter using diffusing charge. The air cleaning device 2 electrically charges particles by emitting ions to a space using diffusing charge and the dust collector 6 subjected to hydrophilic treatment may collect the electrically charged particles.

In the charging unit 4, electrodes generating ions are disposed at the edge of an air flow path and thus reduction in an air volume may be minimized. The charging unit 4 may use carbon fiber formed in a brush shape as electrodes. The charging unit 4 may minimize an amount of generated ozone and maximize an amount of generated ions, as compared to an ionization unit including electrical discharge wires and ground electrodes.

The charging unit 4 includes a charging unit body 14 and carbon fiber electrodes 16 installed on the charging unit body 14. The charging unit 4 may ionize air by high voltage generated from a high voltage generator (not shown). The charging unit 4 may generate ions by ionizing molecules in air. The carbon fiber electrodes 16 of the charging unit 4 may ionize molecules in air through discharge, and generated ions may charge foreign substances in the air. Ions generated from the carbon fiber electrodes 16 charge foreign substances in air.

The charging unit body 14 may form the external appearance of the charging unit 4. The charging unit body 14 may be an electrode-installed member on which the carbon fiber electrodes 16 are installed. The charging unit body 14 may be a housing installed in the air conditioner and protecting the carbon fiber electrodes 16. A space 12 through which air passes may be formed in the charging unit body 14. The space 12 of the charging unit body 14 may be opened in the air flow direction. The space 12 of the charging unit body 14 may be opposite the inside of the dust collector 6 in the air flow direction, and air having passed through the space 12 of the charging unit body 14 may be introduced into the dust collector 6. The charging unit body 14 may be formed to have a rectangular closed loop-shaped cross section and the space 12 may be formed at the inside of the inner circumferential surface of the charging unit body 14.

The carbon fiber electrode 16 may include a brush having a bundle of a plurality of ultrafine carbon fibers having a diameter of μm. The carbon fiber electrode 16 may be a brush including a bundle of 100 carbon fibers having a diameter of 7 μm. The carbon fibers have a small amount of generated ozone O3 and generate ions of a high concentration, thus being capable of charging fine particles. In the carbon fiber electrode 16, i.e., a bundle of a plurality of carbon fibers, only one of the carbon fibers may be electrically discharged. The carbon fiber electrode 16 may be formed in a needle shape or in a net shape having a pattern.

The carbon fiber electrode 16 may be electrically discharged and thus ionize molecules in air. Here, negative ions, such as OH− and O−, or positive ions, such as H+, may be generated. Negative ions generated by the carbon fiber electrode 16 provide electrons to foreign substances and may thus charge the foreign substances to form a cathode. Positive ions generated by the carbon fiber electrode 16 take electrons from foreign substances and may thus charge the foreign substances to form an anode. The carbon fiber electrode 16 may include a plurality of carbon fibers and generate ions by corona discharge.

The carbon fiber electrodes 16 may be disposed on a virtual plane vertical to the air flow direction. The carbon fiber electrodes 16 may be extended in a direction perpendicular to the air flow direction. The carbon fiber electrodes 16 may be disposed at the edge of an air flow path and thus minimize reduction in an air volume. A plurality of carbon fiber electrodes 16 may be installed. The carbon fiber electrodes 16 may be separated from each other so as to minimize interference therebetween.

The carbon fiber electrodes 16 may be located in the space 12 of the charging unit body 14. The carbon fiber electrodes 16 may be located at the edge of the space 12. The carbon fiber electrodes 16 may be installed on inner circumferential surfaces 15 of the charging unit body 14. The carbon fiber electrodes 16 may be installed on the inner circumferential surfaces 15 of the charging unit body 14 so as to protrude toward the space S. The carbon fiber electrodes 16 may charge particles under the condition that the carbon fiber electrodes 16 are located in the space S.

The carbon fiber electrodes 16 may be installed opposite each other. The carbon fiber electrodes 16 may be arranged on the charging unit body 14 at the same interval. The carbon fiber electrodes 16 may be installed on at least two of four inner circumferential surfaces of the charging unit body 14. The carbon fiber electrodes 16 may be installed on two of the four inner circumferential surfaces of the charging unit body 14 so as to be opposite each other. The carbon fiber electrodes 16 may be respectively installed on the four inner circumferential surfaces of the charging unit body 14. The carbon fiber electrodes 16 may occupy less than 10% of the area of the space 12, and the dust collector 6 may be subjected to hydrophilic treatment and have high particle collection efficiency. The dust collector 6 may include ground bodies 22 and high voltage applied bodies 26. At least one of the ground bodies 22 and the high voltage applied bodies 26 may be subjected to hydrophilic treatment and thus, particle collection efficiency of the dust collector 6 may be high.

The ground bodies 22 may be plate-shaped. The ground bodies 22 may be subjected to hydrophilic treatment and a hydrophilic coating layer 24 may be formed on the outer surfaces of the ground bodies 22. The ground bodies 22 may be formed of aluminum. The ground body 22 may include a conductor connected to the ground and a dielectric film around the conductor. If the ground body 22 has a dual structure including a conductor and a dielectric film, the conductor of the ground body 22 may be a carbon electrode formed of carbon and the dielectric film of the ground body 22 may be formed of a material, such as PP, PET, PEN, or PU, and include a nano-filler, such as $TiO_2$, $Al_2O_3$, or $SiO_2$. If the ground body 22 includes a dielectric film, the hydrophilic coating layer 24 may be formed on the outer surface of the dielectric film.

The high voltage applied bodies 26 may be plate-shaped. The high voltage applied bodies 26 may be subjected to hydrophilic treatment and a hydrophilic coating layer 27 may be formed on the outer surfaces of the high voltage applied bodies 26. The high voltage applied bodies 26 may be formed of aluminum. The high voltage applied body 26 may include a conductor connected to the high voltage generator (not shown) and a dielectric film around the conductor. The conductor of the high voltage applied body 26 is electrically connected to the high voltage generator, and may receive high voltage applied from the high voltage generator and form a potential difference with the ground body 22. If the high voltage applied body 26 has a dual structure including a conductor and a dielectric film, the conductor of the high voltage applied body 26 may be a carbon electrode formed of carbon and the dielectric film of the high voltage applied body 26 may be formed of a material, such as PP, PET, PEN, or PU, and include a nano-filler, such as $TiO_2$, $Al_2O_3$, or $SiO_2$. If the high voltage applied body 26 includes a dielectric film, the hydrophilic coating layer 27 may be formed on the outer surface of the dielectric film.

The dust collector 6 may further include a dust collector body 28. The dust collector body 28 may form the external appearance of the dust collector 6. A dust collection space C may be formed in the dust collector body 28. The ground bodies 22 and the high voltage applied bodies 26 may be located in the dust collection space C. The ground bodies 22 and the high voltage applied bodies 26 may be extended in the dust collection space C in a direction perpendicular to the air flow direction. The high voltage applied bodies 26 may be separated from the ground bodies 26 in the direction perpendicular to the air flow direction. A plurality of high voltage applied bodies 26 and a plurality of ground bodies 22 may be located in the dust collection space C of the dust collector 6. The dust collector body 28 may be a ground body installed member, on which the ground bodies 22 are installed, or be a high voltage applied body installed member, on which the high voltage applied bodies 26 are installed. The dust collection space D of the dust collector body 28 may be opened in the air flow direction. The dust collection space C may be located after the charging unit 4 in the air flow direction. The dust collection space S may be located at the rear of the carbon fiber electrodes 16 in the air flow direction. The dust collection space S may be opposite a space between the carbon fiber electrodes 16. The dust collection space C may be opposite the space S of the charging unit 4 in the air flow direction, and air having passed through the space 12 of the charging unit 4 may pass through the dust collection space C of the dust collector 6.

Hereinafter, functions of the above-described air cleaning device in accordance with the present invention will be described.

First, when the air conditioner A is operated, the air cleaning device 2 may be turned on. When the air cleaning device 2 is turned on, the carbon fiber electrodes 16 may perform corona discharge by high voltage applied from the high voltage generator (not shown). Thereafter, the high voltage applied from the high voltage generator (not shown) is applied to the high voltage applied bodies 26 and thus, a potential difference between the high voltage applied bodies 26 and the ground bodies 22 may be generated and dielectric body polarization may occur.

When the carbon fiber electrodes 16 are electrically discharged, air around the carbon fiber electrodes 16 may be ionized into negative ions, such as OH– and O–, or positive ions, such as H+. Foreign substances in air may be charged by the negative ions or the positive ions generated by the carbon fiber electrodes 16 and the foreign substances in the charged state may move to the dust collector 6. The charged foreign substances in air moved to the dust collector 6 may be attached to the dust collector 6. The charged foreign substances moved to the dust collector 6 may be easily attached to the ground bodies 22 or high voltage applied bodies 26, subjected to hydrophilic treatment.

When the dust collector 6 is used in service, a worker may separate the dust collector 6 from the charging unit 4 and then wash only the dust collector 6. The dust collector 6 may be configured so as to be washed and thus be used semi-permanently.

MODE FOR THE INVENTION

Various embodiments have been described in the best mode for carrying out the invention.

INDUSTRIAL APPLICABILITY

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An air cleaning device for air conditioners, comprising:
   a charging unit; and
   a dust collector including ground bodies and high voltage applied bodies forming a potential difference with the ground bodies, and disposed after the charging unit in an air flow direction, wherein the charging unit includes:
   a charging unit body; and
   carbon fiber electrodes installed on the charging unit body for performing corona discharge by high voltage applied from a high voltage generator, wherein a hydrophilic layer is formed on an outer surface of the ground bodies, wherein the charging unit body is formed to have a rectangular closed loop-shaped cross section, and a space is formed at an inside of inner circumferential surfaces of the charging unit body, and wherein the carbon fiber electrodes are respectively installed on the inner circumferential surfaces of the charging unit body.

2. The air cleaning device according to claim 1, wherein each of the carbon fiber electrodes includes a brush having a bundle of a plurality of carbon fibers.

3. The air cleaning device according to claim 1, wherein the carbon fiber electrodes extend in a direction perpendicular to the air flow direction.

4. The air cleaning device according to claim 1, wherein the carbon fiber electrodes are disposed at an edge of an air flow path.

5. The air cleaning device according to claim 1, wherein the carbon fiber electrodes are separated from each other.

6. The air cleaning device according to claim 5, wherein a dust collection space is formed in the dust collector and the dust collector further includes a dust collector body on which the ground bodies and the high voltage applied bodies are installed, and wherein the dust collection space is located at a rear of the carbon fiber electrodes in the air flow direction.

7. The air cleaning device according to claim 1, wherein the carbon fiber electrodes protrude from the inner circumferential surfaces into the space.

8. The air cleaning device according to claim 1, further comprising a filter located prior to the charging unit in the air flow direction.

9. An air cleaning device for air conditioners, comprising:
   a charging unit;
   a dust collector including ground bodies and high voltage applied bodies forming a potential difference with the ground bodies, and disposed downstream of the charging unit in an air flow direction; and
   a filter located upstream of the charging unit in the air flow direction, wherein the charging unit includes:
   a charging unit body; and
   carbon fiber electrodes installed on the charging unit body for performing corona discharge by high voltage applied from a high voltage generator, wherein a hydrophilic layer is formed on an outer surface of the ground bodies, wherein the charging unit body is formed to have a rectangular closed loop-shaped cross section, and a space is formed at an inside of inner circumferential surfaces of the charging unit body, and wherein the carbon fiber electrodes protrude from the inner circumferential surfaces of the charging unit body into the space.

10. The air cleaning device according to claim 9, wherein each of the carbon fiber electrodes includes a brush having a bundle of a plurality of carbon fibers.

11. The air cleaning device according to claim 9, wherein the carbon fiber electrodes extend in a direction perpendicular to the air flow direction.

12. The air cleaning device according to claim 9, wherein the carbon fiber electrodes are disposed at an edge of an air flow path.

13. The air cleaning device according to claim 9, wherein the carbon fiber electrodes are separated from each other.

14. The air cleaning device according to claim 13, wherein a dust collection space is formed in the dust collector and the dust collector further includes a dust collector body on which the ground bodies and the high voltage applied bodies are installed, and wherein the dust collection space is located downstream of the carbon fiber electrodes in the air flow direction.

15. An air cleaning device for air conditioners, comprising:
   a charging unit; and
   a dust collector including ground bodies and high voltage applied bodies forming a potential difference with the ground bodies, and disposed downstream of the charging unit in an air flow direction, wherein the charging unit includes:
   a charging unit body; and
   carbon fiber electrodes installed on the charging unit body for performing corona discharge by high voltage applied from a high voltage generator, wherein a hydrophilic layer is formed on an outer surface of the ground bodies, wherein the charging unit body is formed to have a rectangular closed loop-shaped cross section, and a space is formed at an inside of inner circumferential surfaces of the charging unit body, wherein the carbon fiber electrodes protrude from a central portion of each of the inner circumferential surfaces of the charging unit body into the space in a direction perpendicular to the air flow direction, and wherein each of the carbon fiber electrodes includes a brush having a bundle of a plurality of carbon fibers.

16. The air cleaning device according to claim 15, wherein the carbon fiber electrodes are disposed at an edge of an air flow path.

17. The air cleaning device according to claim 15, wherein the carbon fiber electrodes are separated from each other.

18. The air cleaning device according to claim 17, wherein a dust collection space is formed in the dust collector and the dust collector further includes a dust collector body on which the ground bodies and the high voltage applied bodies are installed, and wherein the dust collection space is located downstream of the carbon fiber electrodes in the air flow direction.

19. The air cleaning device according to claim 15, further comprising a filter located upstream of the charging unit in the air flow direction.

* * * * *